R. ANDERSON.
NUT LOCK.
APPLICATION FILED JAN. 9, 1919.
1,333,529.
Patented Mar. 9, 1920.
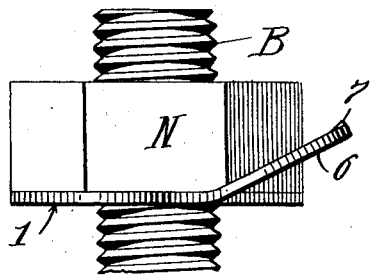
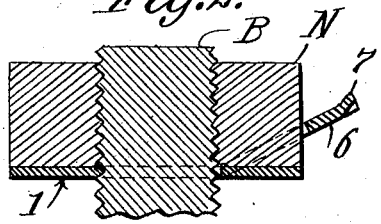
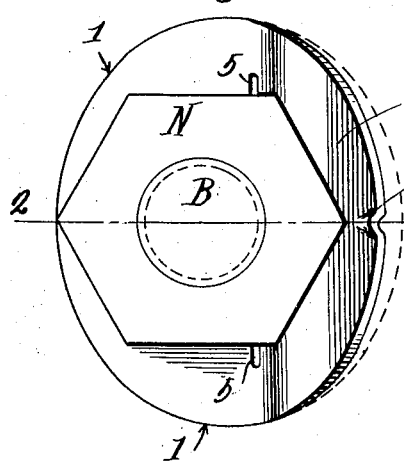 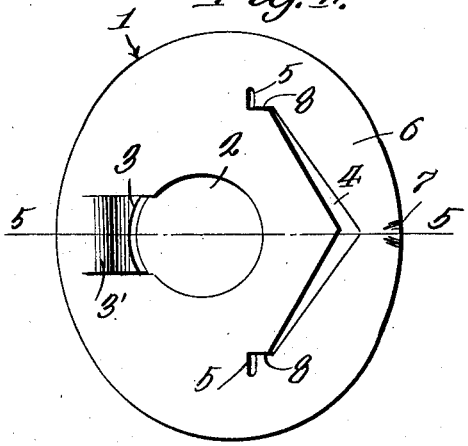
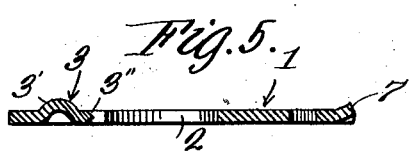
Witnesses
Guy M. Spring
S. M. McColl
Inventor
Robert Anderson
By Richard B. Owen, Attorney

UNITED STATES PATENT OFFICE.

ROBERT ANDERSON, OF MUSKEGON HEIGHTS, MICHIGAN.

NUT-LOCK.

1,333,529.  Specification of Letters Patent.  Patented Mar. 9, 1920.

Application filed January 9, 1919. Serial No. 270,351.

*To all whom it may concern:*

Be it known that I, ROBERT ANDERSON, a citizen of the United States, residing at Muskegon Heights, in the county of Muskegon and State of Michigan, have invented certain new and useful Improvements in Nut-Locks, of which the following is a specification.

This invention relates to nut locks, and the object thereof is to provide a cheap and simple device of this character, which may be quickly applied and which requires no alteration in either the nut or the bolt in connection with which it is to be used.

Another object is to provide a locking washer for a nut constructed so as not to interfere with a wrench used in tightening the nut and which may be easily bent into locking position after the nut is screwed home.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a nut and bolt with this improved lock shown in operative position, Fig. 2 is a vertical section thereof, taken on the line 2—2 of Fig. 3, Fig. 3 is a plan view, Fig. 4 is a plan view of the locking washer detached, and Fig. 5 is a transverse section taken on the line 5—5 of Fig. 4.

In the embodiment illustrated, a bolt B of usual construction is shown, having the usual polygonal nut screwed thereon. The lock constituting this invention comprises a plate or washer 1 which may be of any desired configuration, being here shown slightly ovate with an opening 2 for the passage therethrough of the bolt B. A spring tongue or locking lip 3 communicates with the opening 2, being struck out from the body of the washer and upwardly bowed as shown at 3′ with its free end beveled on both its upper and lower faces as shown at 3″ to facilitate its engagement with the threads of the bolt B when the washer is applied and the nut N screwed down thereon. It is obvious that the opening 2 may be cut or enlarged after the tongue 3 is cut and bowed or a die may be employed which will so form this opening and cut, and bend the tongue simultaneously so that the free end of the tongue will extend into opening 2 when the nut is screwed down.

This washer 1 has a cutout portion 4 arranged diametrically opposite the lip 3 and said cutout portion conforms in shape to the nut in connection with which the washer is to be used, being here shown substantially V-shaped to fit one of the angles of the nut N. Weakening slots 5 extend laterally outward from the opposite end of the cutout portion 4 to facilitate the bending of the locking flange 6 formed by said cutout portion. This flange 6 preferably has an upstruck portion 7 at its perimeter to facilitate the engagement therewith of a lifting tool for forcing up the flange into locking position as shown in Figs. 1, 2 and 3.

In the use of this lock, the washer 1 is first placed on the bolt at the desired position where the nut is to be locked. The nut is then screwed inward on bolt B until it contacts with the washer which is flat, as shown in Fig. 5. The spring lip 3 of the washer is forced by the screwing down of the nut N into engagement with one of the threads of the bolt B to hold the washer securely connected to the bolt, and the flange 6 is then bent upward into the position shown in Figs. 1, 2 and 3, with the corners 8 engaged with the opposed walls of the nut whereby all possibilty of turning of the nut is prevented. The upstruck portion 7 of the washer facilitates engagement therewith of a tool to be used in forcing the flange upward into locking position.

When it is desired to remove the nut, all that is necessary is to bend the flange 6 down to release the corners 8 from engagement with the nut and this will permit sufficient relaxation of the spring lip 3 to enable the washer to be removed.

It is to be understood that these washers may be made in different styles and sizes to fit different styles and sizes of nuts without departing from the principle of the invention.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

Having thus fully described my invention, what I claim is new and desire to secure by Letters Patent, is:—

1. A locking washer for nuts comprising a plate having a central opening and equipped with means for engaging a bolt, said plate having a substantially V-shaped slit opposite said bolt-engaging means with its apex extended toward the periphery of the plate, parallel extensions leading from the inner ends of said slit and provided at their inner ends with outwardly extending right angularly disposed portions thereby forming a nut engaging bendable locking tongue with weakening slots at its base to facilitate its bending.

2. A locking washer for nuts comprising a plate having a central opening with parallel slits extending therefrom toward the periphery of the washer, a spring tongue located between said slits with its free end extending toward said opening, said tongue being bowed outwardly midway its ends, its free end being beveled on its opposed faces, said plate having a substantially V-shaped slit opposite said tongue with its apex extended toward the periphery of the plate, parallel extensions leading from the inner ends of said slit and provided at their inner ends with outwardly extending right-angularly disposed portions, thereby forming a nut engaging bendable locking tongue with weakening slots at its base to facilitate its bending.

In testimony whereof I affix my signature in presence of two witnesses.

ROBERT ANDERSON.

Witnesses:
 STEVE RADAKOVITZ,
 ERNEST J. McCONNELL.